United States Patent [19]

Peterson et al.

[11] 3,895,555

[45] July 22, 1975

[54] TEACHING INSTRUMENT FOR KEYBOARD MUSIC INSTRUCTION

[76] Inventors: Richard H. Peterson, 11748 Walnut Ridge Dr.; Robert A. Finch, 12219 S. 89th Ave., both of Palos Park, Ill. 60464

[22] Filed: Oct. 3, 1973

[21] Appl. No.: 403,260

[52] U.S. Cl. .............................. 84/470; 84/477 R
[51] Int. Cl. ............................................ G09b 15/00
[58] Field of Search ............ 84/470, 477, 478, 1.03, 84/115

[56] References Cited
UNITED STATES PATENTS

| | | | |
|---|---|---|---|
| 3,377,716 | 4/1968 | Schmoyer | 84/478 |
| 3,552,256 | 1/1971 | Soanes et al. | 84/478 |
| 3,683,096 | 8/1972 | Peterson et al. | 84/115 |
| 3,709,085 | 1/1973 | Del Castillo | 84/166 |
| 3,771,406 | 11/1973 | Wheelwright | 84/464 |

*Primary Examiner*—Lawrence R. Franklin
*Attorney, Agent, or Firm*—Jones, Tullar & Cooper

[57] ABSTRACT

A keyboard instrument such as an electric piano or organ has two sets of keys, one set for use in playing chords with the left hand, and another for playing a melody or other part with the right hand. Operating the keys produces musical tones in the usual manner. Individual light indicators are associated with each key of each of the two sets, preferably with indicia for identifying the name of the musical note produced upon operating the corresponding key.

A filmstrip projector is located above the keyboard with a screen in comfortable view of a person seated at the instrument. A two channel magnetic tape player has an audio channel with voice instruction recorded thereon. A second channel carries information in digital form, which upon decoding can be used selectively to a. operate the light indicators for the solo or the accompaniment key groups, or both
b. operate the tone producing means associated with the solo or accompaniment key groups, or both
c. advance the filmstrip.

A series of preprogrammed tapes corresponding to a series of "lessons" may be provided for use with the teaching instrument. Each lesson is comprised of a number of individual lesson segments. Upon completing a given lesson segment the tape player stops and the student has the option of advancing to the next segment, or of repeating the previous segment.

5 Claims, 4 Drawing Figures

3,895,555

TEACHING INSTRUMENT FOR KEYBOARD MUSIC INSTRUCTION

BACKGROUND OF THE INVENTION

Hundreds of thousands of keyboard instruments such as pianos and organs are sold each year. A great many of these quickly fall into disuse because relatively few individuals acquire a sufficient degree of playing proficiency to sustain their interest beyond a brief period of initial enthusiasm. Many electronic organs now come equipped with automatic chord players, arpeggio devices, rhythm machines, and a variety of other playing aids. These make a person with limited playing ability sound better then he really is, but it is questionable whether they lead to a sense of musical fulfillment and it has not been demonstrated that they really diminish the need for conventional musical instruction and practice.

Traditional teaching methods are sometimes ineffective and the prospect of "taking lessons" is not attractive to many people. Besides the obvious economic consideration, many individuals, particularly adults are afraid of being embarrassed if their progress is not up to a teachers expectations.

SUMMARY OF THE INVENTION

It is an object of the invention to provide a special teaching instrument whereby a student can acquire reasonable proficiency in the playing of a keyboard instrument more quickly and easily than has been heretofore possible. It is a further object of the invention to provide a teaching instrument which is able to communicate to a student by sight, by sound, and by example, information required by the student in the course of a "lesson." It is another object of the invention to provide a teaching instrument that can provide programmed lessons and that can instruct a student without the need for a "live" teacher. It is yet another object of the invention to provide a teaching instrument capable of "exercising" a student in the manipulation of the keys of a keyboard instrument. Another object of the invention is to provide a teaching instrument suitable for use in schools, or in music studios, whereby a student can acquire musical instruction at his own pace and at such times as he may choose. It is another object of the invention to provide automatic teaching apparatus wherein individual preprogrammed lessons are presented to a student in short lesson "segments" in such a way that each segment can be easily repeated if desired, thus affording a way for the student to pace his own progress.

To achieve the above, and other, objectives a special teaching instrument is provided. The instrument is preferably similar in appearance to an organ or a piano. Suitable sound producers are provided such that the instrument may be played upon in a conventional manner. For reasons that will become apparent as the description proceeds, it is desirable that the sound producers be electrically operated. Most organs use electric or electronic tone generation and electronic pianos are now also relatively common. Alternatively, a conventional piano may be equipped with solenoids or other electrically operated devices for causing the hammers to strike the strings.

The playing keys of the teaching instrument consist of at least two groups of keys, one group primarily intended for operation by a student's left hand, and a second group intended primarily for operation by a student's right hand. The two groups of keys may be located in separate planes as in a two manual organ or they can be located in a single plane as in a piano. Each group of keys is equipped with a set of individual indicator lamps, there being a separate lamp for each playing key in the group.

A filmstrip projector has a screen located within view of the student. A magnetic tape player having a least two channels controls all the functions of the teaching instrument. An audio channel is connected to a loudspeaker or to a set of earphones and provides audio instruction to the student. A separate digital channel functions to selectively control the automatic operation of the sound producers associated with each of the aforementioned groups of playing keys and/or of the indicator lamps associated with either or both sets of playing keys. The filmstrip projector control mechanism is also operated by the digital channel.

BRIEF DESCRIPTION OF THE DRAWINGS

In the accompanying drawings.

DESCRIPTION OF A PREFERRED EMBODIMENT

Figure 1:
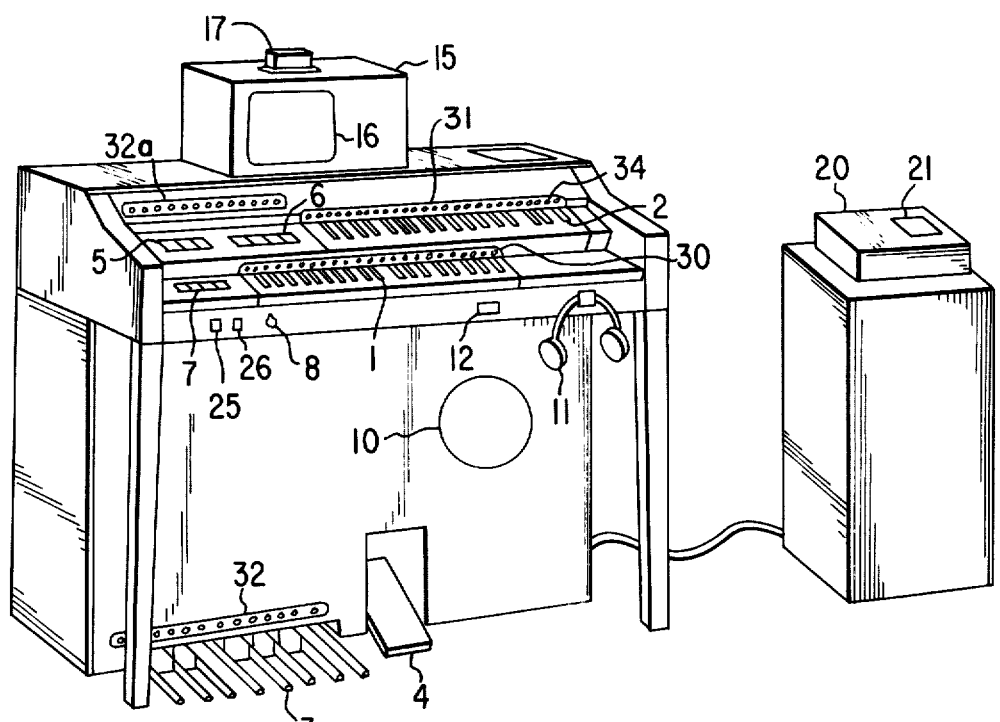
FIG. 1 is a teaching instrument according to the invention.

FIG. 1 shows a teaching instrument especially adapted for the teaching of organ. The instrument has two keyboards or playing manuals. The lower keyboard 1 is usually used for the playing of accompaniment chords and is commonly called the accompaniment manual. The upper manual 2 is commonly used for playing the melody, or solo part, of a musical selection and is called the solo manual. It is conventional for the left hand to operate the accompaniment keys and the right hand the solo keys. A pedal clavier 3 consists of a group of individual pedal keys. Electrically operated tone producers (not shown in FIG. 1) are connected to be operated by keyswitches associated with the various keyboards and pedal clavier in the manner well known to those skilled in the art of electrical musical instruments. The registration controls 5, 6, and 7 also operate in a conventional manner to select the tone color and sound intensity to be produced upon manipulating the keys of the pedal clavier and the solo and accompaniment manuals, respectively. The overall volume of the instrument is controlled by the expression shoe 4. The sound of the electrically operated tone producers is reproduced through the loudspeaker 10 or through the headphones 11 depending upon the position of the switch 12. A visual machine 15 has a screen 16 facing the front of the instrument and a magazine 17 containing a filmstrip. A magnetic tape player 20 is adapted to receive a tape cassette 21. Pushbuttons 25 and 26 located at the front of the teaching instrument control the opertion of the tape transport in a manner which will be described later. Light bars 30, 31, and 32 are sets of indicator lamps and include an individual lamp 34 for each of the keys of the respective keyboards. In FIG. 1 the individual indicator lamps are represented by the circles 34 because it is not practical to show them in greater detail. The pedal indicator lamps 32 may be placed adjacent to the pedal keys and they may alternately be placed nearer to eye level such as at 32a, or two sets of lamps can be operated in parallel.

Figure 2:
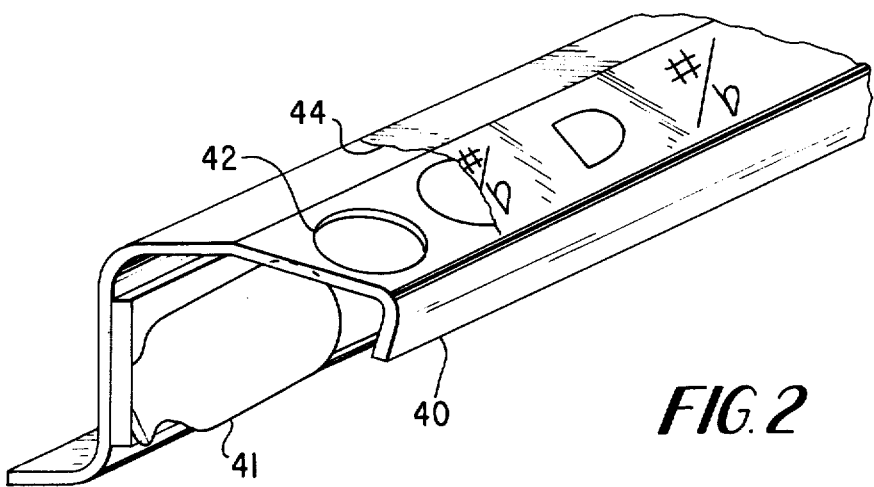
FIG. 2 shows a preferred form of the indicator lamp assemblies.

FIG. 2 shows one of the sets of indicator lamps in greater detail. The complete assembly, sometimes called a light bar, consists of the channel 40 which houses a series of individual lamps 41 arranged such that when the light bar is positioned above its associated keyboard, the lamps are directly behind their respective keys. The apertures 42 permit light from the lamps to pass through the transluscent material 44 which carries indicia as to the name of the note produced by the corresponding key, such as C, C sharp, D, etc.

Figure 3:
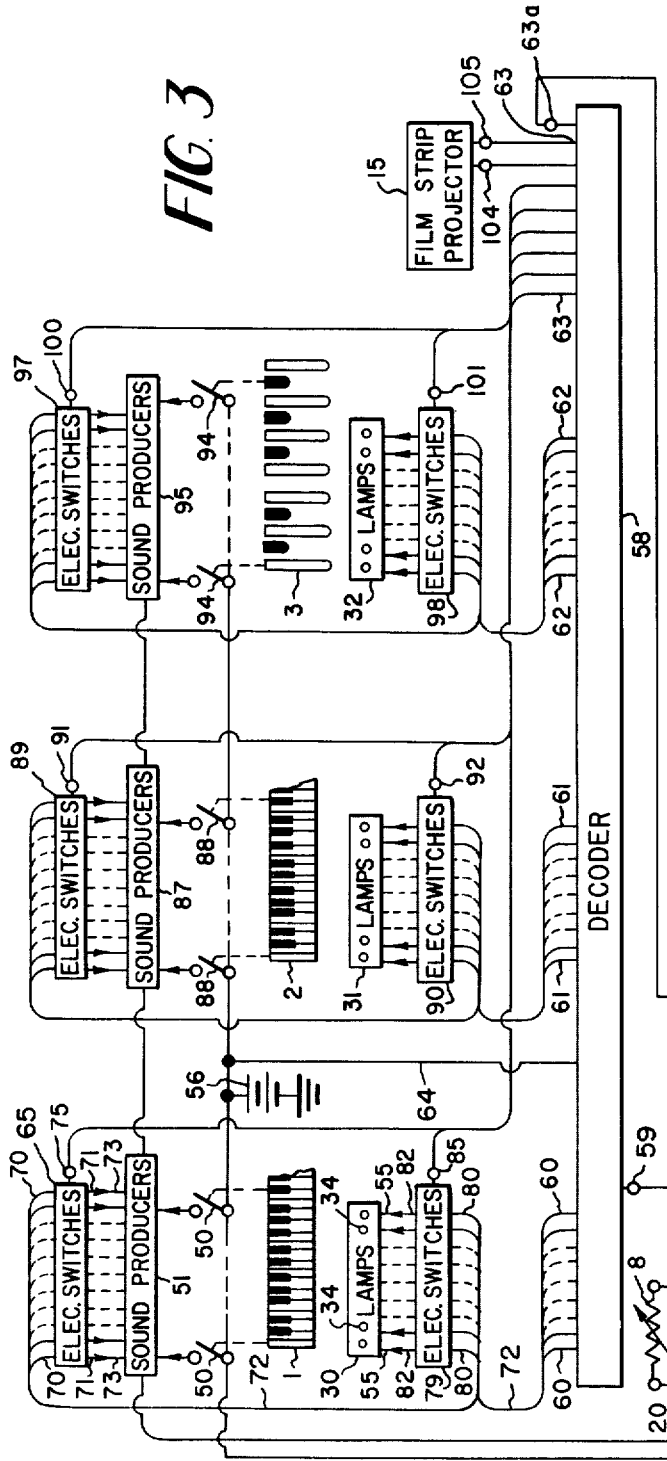
FIG. 3 is a block diagram of a system according to the invention.

In FIG. 3, elements that correspond to similar elements in FIG. 1 carry the same reference characters. The group of playing keys 1 is the accompaniment manual and each of the keys operates a keyswitch 50 connected to energize the corresponding sound producer of the set of sound producers 51. The nature of the sound producers is not important in terms of the invention and may be a set of organ pipes with electrically operated valves, or may be any type of electric organ tone generator. If the sound producers are electronic they should be connected into the amplifier 53 for reproduction through the loudspeaker 10, or the headphones 11, depending upon the position of the switch 12. The light bar 30 is located above the accompaniment keyboard, as shown in FIG. 1, and includes a series of lamps 34, each of which has a terminal 55. The power source 56 supplies power for the operation of the sound producers and for the operation of the lamps as will be described below. The tape player 20 has a first, audio, channel 57 whose output is connected to the amplifier 53. Instructions recorded on this audio channel are heard by the student through the loudspeaker 10 or the headphones 11. The decoder 58 is connected to the second, digital channel of the tape player at terminal 59. The operation of the digital channel and of the decoder may be as described in U.S. Pat. No. 3,683,096 dated Aug. 8, 1972 and issued to applicants herein. It is believed sufficient to say that the decoder is connected to the power source 56 through the conductor 64 and that the decoder functions to decode data prerecorded on a magnetic tape and reproduced by the digital channel of the tape player 20, with the result that the sets of decoder output terminals identified by the reference characters 60, 61, 62, and 63 may be selectively energized in any desired combination in accordance with said prerecorded data. A series of electronic switches are shown at 65. This set of switches includes an individual electronic switch for each of the keys of the keyboard 1. Each of the individual switches has an input terminal 70 and an output terminal 71. The decoder output terminals 60 are respectively connected through cable 72 to corresponding input terminals 70, and the output terminals 71 are respectively connected to the terminals 73 of the sound producers 51. The set of electronic switches 65 has a single control terminal 75 which when energized causes a connection to be made between each of the input terminals 70 and its related output terminal 71. Thus when terminal 75 is energized with DC potential, the terminals 60 of the decoder are connected to the terminals 73 of the sound producers with the result that any potential on a decoder terminal 60 will be effective to sound the related sound producer. In a similar manner another set of electronic switches 79 have input terminals 80 connected to the decoder terminals 60 by means of cable 72, and output terminals 82 connected to the lamp terminals 55. The set of electronic switches 79 have a control terminal 85 which functions, as previously described, to connect the individual terminals 80 with the individual terminals 82 when terminal 85 is energized with DC potential. Energizing terminal 85 thus results in the operation of the lamps 34 by the potential appearing on the decoder terminals 60. It will be apparent then that data recorded on the digital channel of tape player 20 selectively energizes the decoder output terminals 60 which are connected to either the lamp assembly 30, or to the sound producers 51, or to both by electronic switches which are in turn controlled by DC potential applied to terminals 75 and/or 85. The sound producers 87 are similar to the sound producers 51 previously described except that they are associated with the solo keyboard 2 and with the solo key contacts 88. The electronic switches 89 and 90 are the solo manual equivalents of the electronic switches 65 and 79 and control the operation of the lamps 31 and the sound producers 87 from the decoder output terminals 61 in response to the energization of control terminals 91 and 92. In like manner the keyswitches 94 are operated by the pedal keys of the clavier 3 and operate the sound producers 95. Electronic switches 97 and 98 connect the sound producers 95 and the lamps 32 to the decoder output terminals 62 when the control terminals 100 and 101 are energized. The control terminals 75, 85, 91, 92, 100 and 101 are each connected to one of the control output terminals 63 and accordingly are energized selectively by data prerecorded on the digital channel of the tape player. Other of the control output terminals 63 are connected to the forward filmstrip advance terminal 104 and to the filmstrip reverse terminal 105 of the filmstrip projector 15 so that the digital channel can also operate the filmstrip projector. Still another of the control output terminates 63 is used to control the tape player in a manner to be described later.

Figure 4:
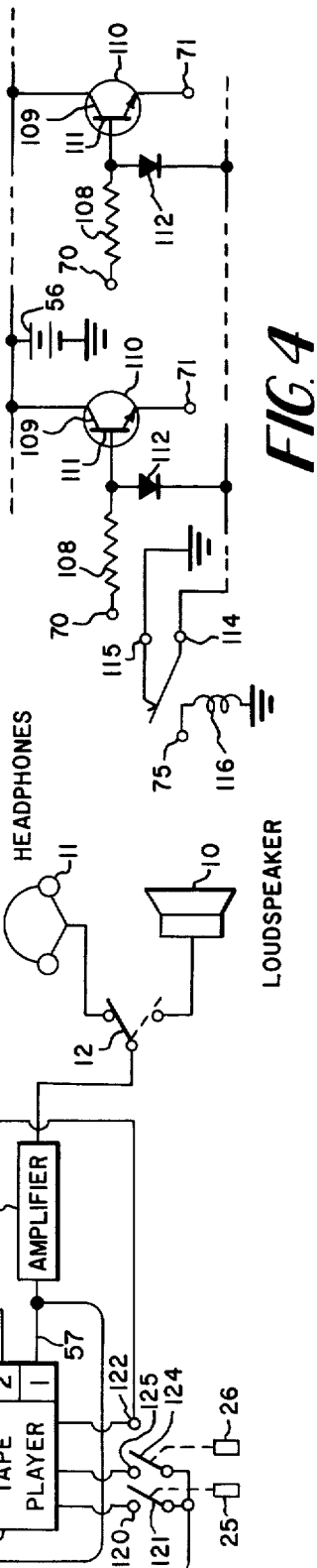
FIG. 4 is a schematic diagram of an electronic switching circuit suitable for use with the invention.

FIG. 4 is a schematic diagram of a suitable electronic switch for performing the switching functions described in connections with the switch assemblies 65, 79, 89, 90, 97, and 98. Each individual switching circuit has an input terminal 70 and an output terminal 71. The collector 109 of an emitter follower transistor 110 is connected to the power source 56. If a positive potential is applied to terminal 70, this potential will be applied to the base 111 through resistor 108 and this potential will appear at the output terminal 71. Diodes 112 provide a way of turning off the electronic switches by shorting the bases of the transistors to ground through the normally closed relay contacts 114 and 115. The application of DC potential to the control terminal 75 of the relay coil 116 removes the ground and causes the transistor 110 to conduct.

To "take a lesson" with the Teaching Instrument of the invention, a student inserts a filmstrip into the filmstrip projection and a magnetic tape cassette into the tape player and pushes the start button. Voice instructions augment the visual material presented on the screen and at appropriate times data on the digital channel automatically advances the film strip. In addition the "instructor" can "show" the student what keys to play by causing the individual indicator lamps to light at appropriate times. In addition the electronic "instructor" can demonstrate the desired musical result by "playing" the instrument sound producers.

In a typical lesson the student is taught the melody part of a musical selection by having him follow the lights (playing the keys called for by the "instructor") while the "instructor" automatically plays the accompaniment and pedal parts. Once the melody part is mastered the chords and then the pedal are taught in a similar manner.

As the student is directed to play different playing keys by the indicator lamps the "instructor" can simultaneously call out the names of the notes or give additional advice as to what fingers to use, or he can help establish the rhythm or meter of the music by counting or humming or singing. If desired it is possible to record another musical instrument or an orchestra on the audio channel and the student can "play along" simultaneously.

Not all students have the same learning ability, and it has been found that a lesson that proceeds at a pace appropriate for a slow student will be boring to a faster student. It has been found experimentally that variations in the speed of the magnetic tape of approximately plus or minus 10 percent have a very significant effect on the "pace" of the lesson. A speed control to effect such a variation is provided on the front of the instrument and is identified in FIGS. 1 and 3 by the reference character 8.

Further control over the pace of a lesson is provided by presenting a lesson in many short segments. Referring to FIGS. 1 and 3, push button 25 starts the tape player by applying power from the power source 56 to the "on" terminal 120 through switch 121. At the end of each lesson segment a data pulse on the digital channel energizes the control terminal 63a. Potential is thus applied to the "off" terminal 122 of the tape player and the tape stops. At this point the student has the option of again pushing the start button 25 and proceeding to the next lesson segment, or of pushing the "repeat" button 26 which applies potential from the power source 56 through switch 124 to the repeat terminal 125. Power applied to the repeat terminal causes the magnetic tape to rewind to the start of that last lesson segment and then to automatically energize the "start" terminal. The result is that the preceding lesson segment is repeated. In this way the student advances to the next segment only when he is satisfied that he has mastered the preceding one.

It will be obvious that many modifications, changes and substitutions can be made to the exemplary embodiment disclosed without departing from the true spirit of the invention. For example, multiple pole mechanical switches can be substituted for the electronic switches shown, or other types of electronic switching might be employed. Or operator controlled switches might be used to manually energize the electronic switch control terminals instead of, or in addition to, the automatic energization provided by the decoder control terminals 63. It would of course also be possible to derive some of the control functions from coded tone signals recorded on the audio channel instead of from the digital channel.

As at present advised as to the apparent scope of our invention we claim:

1. A teaching instrument for music instruction wherein a student is provided with preprogrammed audio instructions accompanied by activation of sound producers, indicator lamps, or both, to illustrate the audio instructions, comprising;

a set of electrically operated sound producers for a musical instrument;

a set of playing keys connected to corresponding sound producers and being operable by a student to play said musical instrument;

a first set of electrical switches corresponding to and operable to activate said sound producers;

a set of electrically operated lamp indicators corresponding to and associated with said playing keys for identifying said keys and indicating operations to be carried out by the student in playing said instrument;

a second set of electrical switches corresponding to and operable to activate said lamp indicators, a magnetic tape recorder having an audio channel carrying prerecorded audio instructions and a digital channel carrying prerecorded digital signals, said channels being simultaneously operable to produce synchronized audio instructions and digital signals, respectively;

decoding means connecting said digital channel through said first set of switches to said electrically operated sound reproducers and through said second set of switches to said electrically operated lamp indicators and responsive to digital signals in said digital channel to selectively activate said sound reproducers and corresponding lamp indicators;

speed control means connected to said recorder for selectively increasing and decreasing the speed thereof to permit variation in the pace of instruction; and additional decoding means responsive to digital signals in said digital channel for selectively activating and deactivating said first and second sets of switches whereby said sets of sound producers and lamp indicators may be selectively activated for instructing a student.

2. The teaching instrument of claim 1, further including a filmstrip projector, and projector control means connected to said additional decoding means, said additional decoding means being responsive to digital signals in said digital channel to operate said projector.

3. A teaching instrument for keyboard music instruction comprising: a first set of accompaniment playing keys arranged for convenient opeation by a student's left hand; a second set of solo playing keys arranged for convenient operation by a student's right hand;

a first set of electrically operated sound producers associated respectively with said first set of playing keys; a second set of electrically operated sound producers associated respectively with said sound set of playing keys;

a first set of electric indicator lamps located adjacent said first set of playing keys; a second set of electric indicator lamps located adjacent said second set of playing keys; a magnetic tape player having a first audio channel and a second digital channel; an amplifier and a translating device connected to said first audio channel; a decoder connected to said digital channel, said decoder having a first series of accompaniment DC output terminals, a second series of solo DC output terminals, and a third series of control output terminals, all of said output terminals capable of being energized selectively with DC potential in response to data prerecorded on said digital channel;

first electrically operated switch means for selectively connecting said first series of accompaniment DC output terminals to operate said first set of electrically operated sound producers; second electrically operated switch means for selectively connecting said first series of accompaniment DC output terminals to operate said first set of electric indicator lamps; third electrically operated switch means for selectively connecting said second series of solo DC output terminals to operate said second set of electrically operated sound producers; fourth electrically operated switch means for selectively connecting said second series of solo DC output terminals to operate said second set of electric indicator lamps; and connections between said third series of control output terminals and said electrically operated switch means for causing the selective operation thereof.

4. A teaching instrument according to claim 3, said instrument including a third set of pedal keys, said decoder further including a fourth series of pedal DC output terminals capable of being energized selectively with DC potential in response to data prerecorded on said digital channel, a third set of electrically operated sound producers associated respectively with said third set of pedal keys, and fifth electrically operated switch means for selectively connecting said fourth series of pedal DC output terminals to operate said third set of electrically operated sound producers.

5. A teaching instrument according to claim 3 and in which said magnetic tape player includes an on terminal, an off terminal and a repeat terminal for controlling its operation by the application of operating potentials to said terminals;

a source of operating potential; an on switch connected between said source of operating potential and said on terminal; a repeat switch connected between said source of operating potential and said repeat terminal, and means controlled by said third decoder series of terminals for applying operating potential to said off terminal in response to data recorded on said digital channel.

* * * * *

UNITED STATES PATENT AND TRADEMARK OFFICE
CERTIFICATE OF CORRECTION

PATENT NO. : 3,895,555
DATED : July 22, 1975
INVENTOR(S) : Richard H. Peterson, Robert A. Finch It is certified that error appears in the above-identified patent and that said Letters Patent are hereby corrected as shown below:

In the Claims

Claim 3, line 3, (column 6, line 49)
         change "opeation" to --operation--.

Claim 3, line 9, (column 6, line 56)
         change "sound" to --second--.

Claim 5, line 11, (column 8, line 20)
         change "decoder series of terminals"
         to --series of decoder terminals--.

Signed and Sealed this sixteenth Day of September 1975

[SEAL]

Attest:

RUTH C. MASON
*Attesting Officer*

C. MARSHALL DANN
*Commissioner of Patents and Trademarks*